United States Patent [19]
Dempf et al.

[11] Patent Number: 4,721,229
[45] Date of Patent: Jan. 26, 1988

[54] OUTPUT STACKER FOR A DOCUMENT PROCESSING FACILITY

[75] Inventors: Josef Dempf, Klosterlechfeld; Erich Moser, Taufkirchen, both of Fed. Rep. of Germany

[73] Assignee: Siemens Aktiengesellschaft, Berlin and Munich, Fed. Rep. of Germany

[21] Appl. No.: 820,787

[22] Filed: Jan. 22, 1986

[30] Foreign Application Priority Data

Jan. 25, 1985 [DE] Fed. Rep. of Germany ....... 3502505

[51] Int. Cl.$^4$ ..................... B65H 31/26; B65H 31/30
[52] U.S. Cl. ......................................... 221/13; 221/15; 221/195; 235/379; 271/189; 271/213; 271/220
[58] Field of Search ................... 271/207, 3, 3.1, 163, 271/189, 213, 220; 221/21, 13, 15, 191, 195, 12; 235/379; 194/202, 206

[56] References Cited

U.S. PATENT DOCUMENTS

| | | | |
|---|---|---|---|
| 3,918,701 | 10/1975 | Lee | 271/224 X |
| 4,220,323 | 9/1980 | Smith | 271/213 X |
| 4,319,132 | 3/1982 | Guibord et al. | 221/13 X |
| 4,381,445 | 4/1983 | Jenkins et al. | 235/379 |
| 4,450,978 | 5/1984 | Graef et al. | 221/13 |

FOREIGN PATENT DOCUMENTS

| | | | |
|---|---|---|---|
| 1296431 | 5/1969 | Fed. Rep. of Germany | 271/310 |
| 0031856 | 2/1983 | Japan | 271/224 |

Primary Examiner—Joseph J. Rolla
Assistant Examiner—Frederick R. Handren
Attorney, Agent, or Firm—Hill, Van Santen, Steadman & Simpson

[57] ABSTRACT

In a document processing facility whose operation is initiated by user-associated authorization cards which can be plugged into a badge reader, a deposit stacker which is not accessible from the outside is provided below the output stacker. A document seating surface is provided in this output stacker, this document seating surface being movable by a drive device back and forth between a document output position and a deposit position, whereby, in the deposit position, an opening in the deposit stacker is exposed, the documents falling into the deposit stacker after being released by braking elements provided in the output stacker.

9 Claims, 3 Drawing Figures

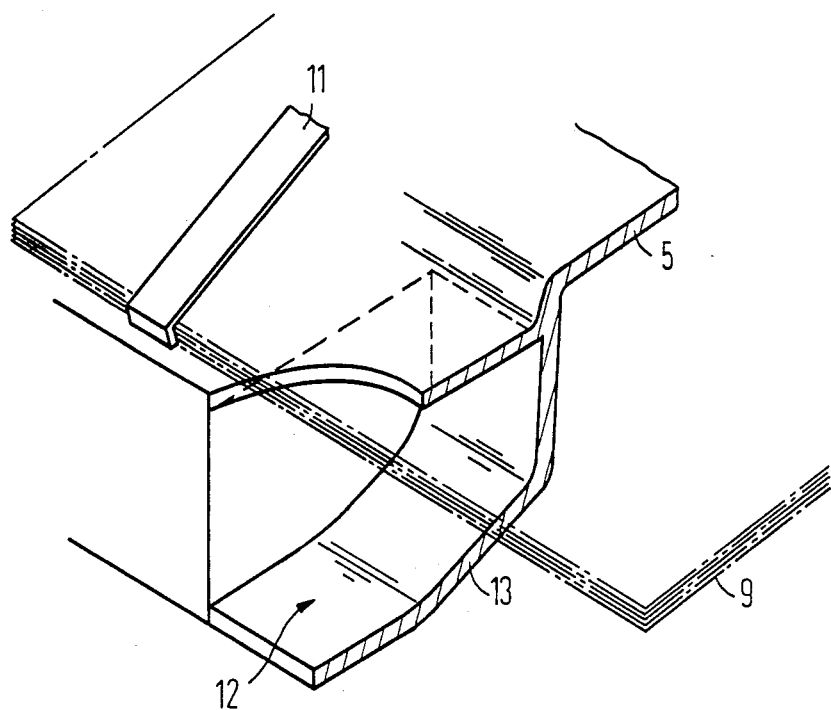

OUTPUT STACKER FOR A DOCUMENT PROCESSING FACILITY

BACKGROUND OF THE INVENTION

1. Field of the Invention

The invention relates to an output stacker for a document processing facility whose operation is initiated by a user-associated authorization card which is pluggable into a badge reader including holding devices for the document or documents offered for removal in the output stacker.

2. Description of the Prior Art

Such document processing facilities can, for example, be what are referred to as statement of account printers which are set up as self-service devices in the counter or teller area of banks and savings institutions. Insofar as the user possesses an authorization card, for example a magnetic strip-coded checking card, these provide the user with the possibility of having his most recent account transactions and, thus, the current account balance printed out. In known statement of account printers, the output of the individual documents ensues via an output slot from which the respective user can ultimately pull them. Documents which the appertaining user leaves behind for whatever reason are thus not only immediately accessible to the next user at the facility but, over and above this, also block the apparatus.

SUMMARY OF THE INVENTION

It is therefore an object of the present invention to provide an output stacker for document processing facilities, for example for statement of account printers, such that the documents mistakenly left behind in the output stacker by a user cannot proceed into someone else's hands for reasons of data protection.

This object is achieved in accord with the invention by constructing the holding devices identified above with a document seating surface and at least two braking elements resiliently seated on the seating surface, providing a deposit stacker, which is not accessible from the outside by the user, below the output stacker, and providing that said document seating surface can be moved back and forth by a drive device between a document output position and a deposit position, whereby an opening into the deposit stacker is provided in the deposition position, the document or documents falling into said deposit stacker after being released by the braking elements.

BRIEF DESCRIPTION OF THE DRAWINGS

An exemplary embodiment of the invention shall be set forth in greater detail below with reference to the drawing. Thereby shown are:

FIG. 3 is a partial perspective view of the output stacker of FIGS. 1 and 2.

DESCRIPTION OF THE PREFERRED EMBODIMENTS

Figure 1:
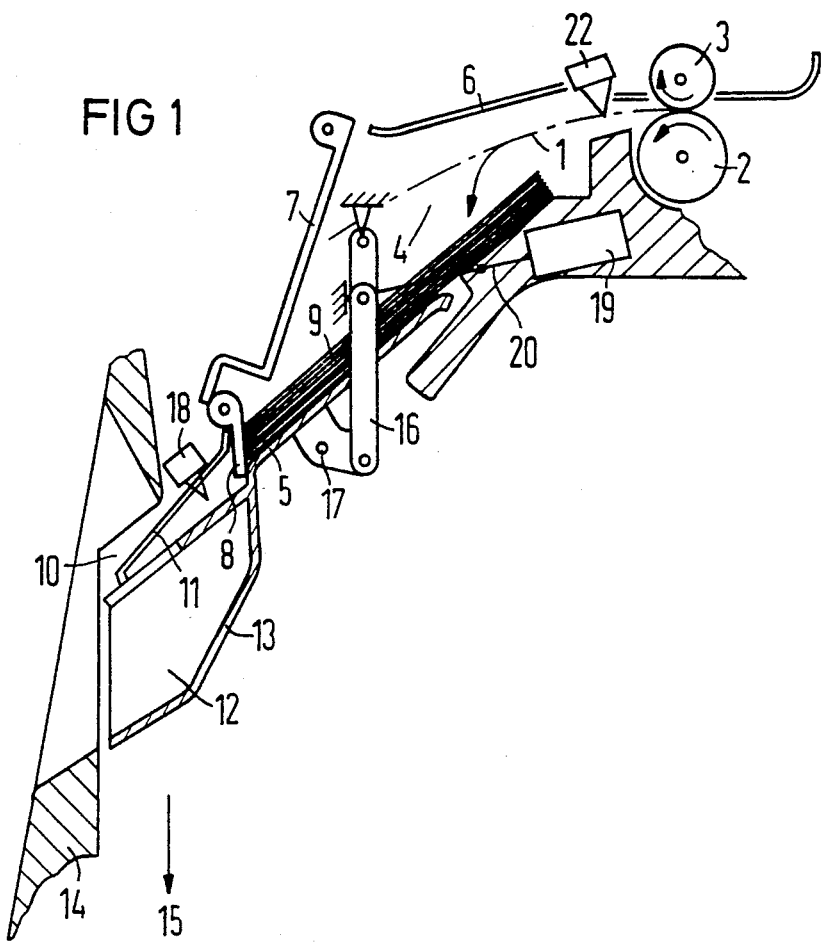
FIG. 1 is a side sectional view of an output stacker for a statement of account printer and surrounding environment for receiving one or more documents.

FIG. 1 shows an output stacker for a document processing facility, for example for a statement of account printer, for outputting individual documents 1 detached from a cross-perforated continuous form paper web. After being detached, these individual documents are seized by a roller pair 2, 3 and are subsequently supplied to a collecting stacker 4 where they are deposited stackwise on downwardly inclined document seating surface 5. The upper limitation of the collecting stacker 4 is formed by two paper guide elements 6, 7. The paper guide element 7 is preferably pivotably seated in order to enable easier access to the collecting stacker 4 in case of a paper jam. Two pivotable blocking fingers 8 are provided at the output of the collecting stacker 4, these blocking fingers 8 being supported against a stepped edge of the document seating surface 5 in the closed condition and thus preventing a further descent of the document stack 9 into the following output stacker 10 until all documents, for example statements of account, intended for the respective user are printed and stacked in the collecting stacker 4.

The light barrier or sensor 22 monitors the transport by the roller pair 2, 3 as well as the faultless parting or detaching of the documents. After the two blocking fingers 8 have been pivoted up, all documents present in the collecting stacker 4 slide on the pivotably supported seating surface 5, sliding into the output stacker 10 and, therein, are prevented from falling out by means of two braking springs 11. A recessed grip area or cavity 12 formed by a trough-like projecting member 13 is provided at the underside of that part of the document seating surface 5 extending into the output stacker 10 in order for the user's hand to remove the documents. Further, the ouput stacker 10 is appropriately enlarged by a clearance or opening provided in the housing cover 14. The documents or statements of account, finally, are manually pulled from the output stacker 10 against the resistance of the braking springs 11.

Figure 2:
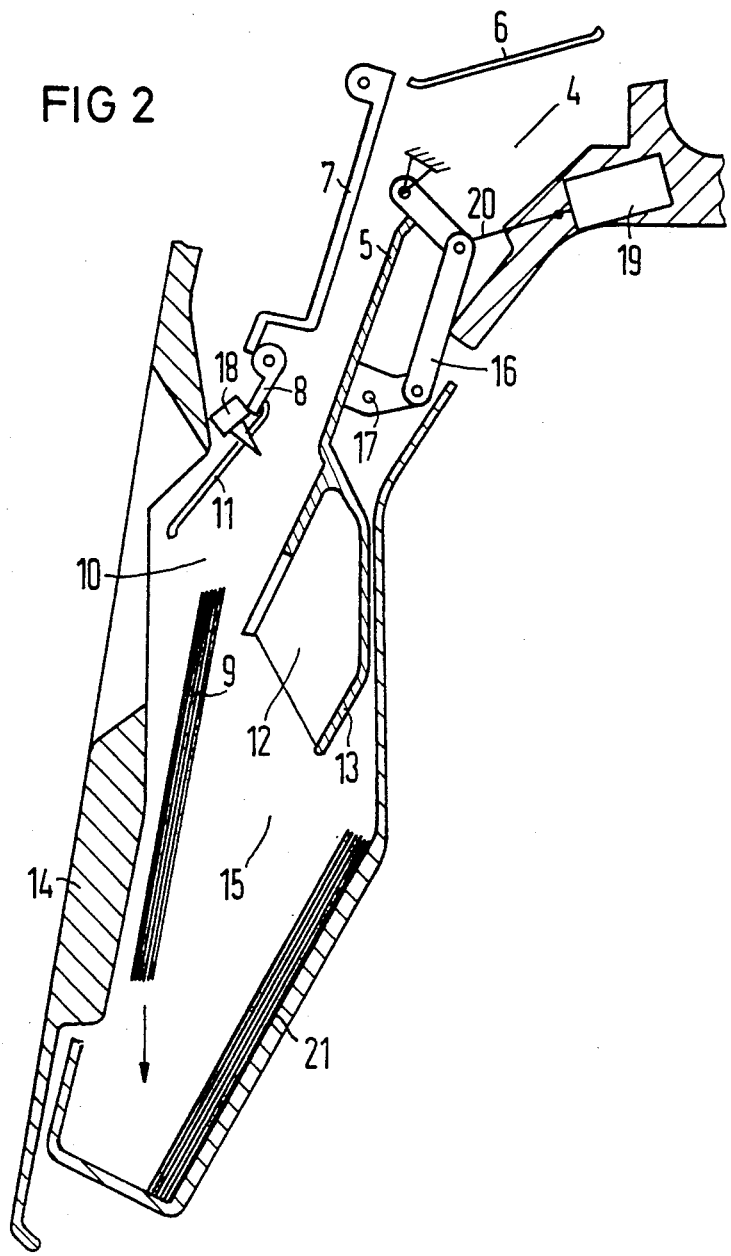
FIG. 2 is a side sectional view of the output stacker of FIG. 1 with an appertaining deposit stacker for receiving documents which are not taken by the user.

In case the documents are not taken in due time, a further conveying into a deposit stacker 15 which is not accessible by the user from the outside is undertaken for reasons of data protection. As may be seen from FIG. 2, the document seating surface 5 is pivoted around the rotational axis 17 via a drive device such as a bent lever mechanism 16 for this purpose, whereby the documents 9 descent into the deposit stacker 15 lying therebelow due to the force of gravity after they are released by the braking springs 11, the documents 9 leaning against an obliquely erect supporting wall 21 in this deposit stacker 15. The maintenance personnel can remove them from here after the housing cover 14 has been opened. The drive device 16 may be controlled by a timing element (not shown) such that, after the documents are in the output stacker, the document seating surface 5 is moved from the document output position into the deposit position after a prescribed time has elapsed.

The sliding of the documents 9 into the output stacker 10 after the opening of the blocking fingers 8, the removal of the documents by the customer and, finally, the condition as to whether the output stacker 10 is free of paper after the rocker has pivoted away and returned into its initial position are monitored via the light barrier 18 provided in the output stacker 10.

The pivot of the document seating surface 5 is blocked by the bent lever mechanism 16 which is elongated in the output position. Pivoting the rocker back from the outside and access into the deposit stacker 15 are thus prevented. The bent lever mechanism 16 is held in an elongated position by a restoring spring and by a detent. It is pivoted to its bent position with the assistance of an electromagnet 19 with tie bar 20.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A document processing facility whose operation is initiated by a user-associated authorization card which is pluggable into a badge reader, including a housing with an access opening extending therethrough and an output stacker in said housing which is accessible through said access opening, said output stacker having a document seating surface movable between a document output position and a deposit position, and holding devices for documents offered for removal in the output stacker; a deposit stacker which is positioned in said housing below said output stacker so as to be inaccessible from the outside; a communicating opening formed between a bottom edge of said document seating surface and said deposit stacker when said document seating surface is in said deposit position; a drive device for moving said document seating surface back and forth between said document output position and said deposit position in which the documents fall through said communicating opening into said deposit stacker after being released by said holding devices, comprising the improvement that said document seating surface is downwardly inclined toward said access opening when in said output position, that said holding devices comprise at least two spring elements resiliently supported on said document seating surface and that a trough-like projecting member forming a recessed grip area is rigidly attached to the underside of said document seating surface, said projecting member having a forwardly directed edge below said seating surface terminating in alignment with a bottom edge of said access opening when said output stacker is in said document output position and, thus, closing said communicating opening for said deposit stacker.

2. A document processing facility according to claim 1, wherein said document seating surface is pivotally seated in said document processing facility.

3. A document processing facility according to claim 1, wherein said drive device is a bent lever drive.

4. A document processing facility according to claim 1, wherein said drive device is controlled by means of a timing element such that, after said documents are in said output stacker, said document seating surface is moved from said document output position into said deposit position after a prescribed time has elaspsed.

5. A document processing facility, user operable by means of an authorization device, which includes a housing with an access opening extending therethrough and an output stacker in said housing which is accessible through said access opening, said output stacker having a document seating surface movable between a document output position and a deposit position and holding devices for the documents presented for removal in the output stacker comprising:

a deposit stacker positioned in said housing below said output stacker so as to be inaccessible by the user;

said document seating surface being downwardly inclined toward said access opening when in said output position;

said holding devices mounted independently of said document seating surface and comprising means resiliently supported on said document seating surface;

a drive device engagable to move said document seating surface between said document output position and said deposit position, movement of said document seating surface into said deposit position resulting in the disengagement of said holding devices from said seating surface;

a communicating opening formed between a bottom edge of said document seating surface and said deposit stacker when said document seating surface is moved to said deposit position;

a trough-like projecting member forming a recessed grip area being rigidly attached to the underside of said document seating surface, said projecting member having a forwardly directed edge below said seating surface terminating in alignment with a bottom edge of said access opening when said output stacker is in said document output position and, thus, closing said communicating opening for the deposit stacker;

whereby said documents will fall into said deposit stacker upon the movement of said seating surface to said deposit position.

6. A document processing facility according to claim 5, wherein said document seating surface is pivotally mounted in said facility to rock between said output and deposit positions.

7. A document processing facility according to claim 5, wherein said holding means comprises a plurality of spring members.

8. A document processing facility according to claim 5, wherein said drive device comprises a bent lever drive.

9. A deposit processing facility according to claim 5 including a timing device for controlling operation of said drive device, such that after said documents are in said output stacker, said document seating surface is moved from said document output position into said deposit position after a prescribed time has elapsed.

* * * * *